United States Patent
Takeuchi et al.

(10) Patent No.: US 6,722,565 B2
(45) Date of Patent: Apr. 20, 2004

(54) DATA CODE LABEL, A METHOD OF DECODING DATA CODES, AND AN OPTICAL DATA CODE DECODING SYSTEM

(75) Inventors: Hiroyoshi Takeuchi, Aichi-ken (JP); Nobuyuki Teraura, Tokai (JP)

(73) Assignee: Denso Corporation, Kariya (JP)

( * ) Notice: Subject to any disclaimer, the term of this patent is extended or adjusted under 35 U.S.C. 154(b) by 115 days.

(21) Appl. No.: 10/078,274

(22) Filed: Feb. 20, 2002

(65) Prior Publication Data

US 2002/0113127 A1 Aug. 22, 2002

(30) Foreign Application Priority Data

Feb. 21, 2001 (JP) ........................... 2001-045032
Nov. 26, 2001 (JP) ........................... 2001-359466

(51) Int. Cl.$^7$ ............................. G06K 7/10; G06K 7/14
(52) U.S. Cl. .................. 235/454; 235/437; 235/462.13; 235/462.25
(58) Field of Search ................. 235/454, 462.01, 235/462.13, 462.15, 462.25, 470, 487, 492, 437, 494, 375, 462.45; 340/10.2, 572.7

(56) References Cited

U.S. PATENT DOCUMENTS

| | | | | |
|---|---|---|---|---|
| 5,949,059 A | * | 9/1999 | Rawson, Sr. et al. | ....... 235/487 |
| 5,962,834 A | * | 10/1999 | Markman | ................... 235/385 |
| 5,984,176 A | * | 11/1999 | Koda et al. | .............. 235/375 X |
| 6,056,199 A | * | 5/2000 | Wiklof et al. | ........... 235/462.45 |
| 6,109,526 A | * | 8/2000 | Ohanian et al. | ........ 235/462.45 |
| 6,371,375 B1 | * | 4/2002 | Ackley et al. | .......... 235/462.45 |
| 2002/0088865 A1 | * | 7/2002 | He et al. | ...................... 235/494 |
| 2002/0167406 A1 | * | 11/2002 | Garber et al. | ............. 340/572.7 |
| 2002/0196126 A1 | * | 12/2002 | Eisenberg et al. | .......... 340/10.2 |

FOREIGN PATENT DOCUMENTS

| | | | |
|---|---|---|---|
| JP | 10-40329 A | * | 2/1998 |
| JP | 2000-112354 A | * | 4/2000 |

OTHER PUBLICATIONS

U.S.S.N. 09/667,799 (Hara, filed on Sep. 22, 2000).

* cited by examiner

*Primary Examiner*—Jared J. Fureman
(74) *Attorney, Agent, or Firm*—Posz & Bethards, PLC

(57) ABSTRACT

A data code label including a QR code and an ID tag including a memory having an identification code area and a decode data writing area. A data code in the QR code showing an error in decoding is corrected and stored in the memory in the ID tag while the degree of defection of the QR code is low. When the defects advance, the error rate will increase. If the error occurs after advance of defects, the decode data in the memory is read when the error is detected. If the decode data cannot be read, the error correction is effected. If the error rate is higher than a reference, the decode data is obtained from the memory. If this decreases the error rate under the reference, the error correction is effected.

7 Claims, 8 Drawing Sheets

FIG. 6 PRIOR ART

| | E68 | E50 | E32 | E15 | D43 | | | |
|---|---|---|---|---|---|---|---|---|
| | E67 | E49 | E31 | E14 | D42 | | | |
| | E66 | E48 | E30 | E13 | D41 | | | |
| | E65 | E47 | E29 | E12 | D40 | | | |
| E88 E83 E78 E73 | E64 | E46 | E28 | E11 | D39 | D26 | D12 | D5 |
| | E63 | E45 | E27 | E10 | D38 | D25 | | |
| E87 E82 E77 E72 | E62 | E44 | E26 | E9 | D37 | D24 | D11 | D4 |
| | E61 | E43 | E25 | E8 | D36 | D23 | | |
| E86 E81 E76 E71 | E60 | E42 | E24 | E7 | D35 | D22 | D10 | |
| | E59 | E41 | E23 | E6 | D34 | D21 | | |
| E85 E80 E75 E70 | E58 | E40 | E22 | E5 | D33 | D20 | D9 | D3 |
| | E57 | E39 | E21 | E4 | D32 | D19 | | |
| E84 E79 E74 E69 | E56 | E38 | E20 | E3 | D31 | D18 | D8 | |
| | E55 | E37 | E19 | E2 | D30 | D17 | | |
| | E54 | E36 | E18 | E1 | D29 | D16 | D7 | D2 |
| | E53 | E35 | E17 | D46 | D28 | D15 | | |
| | E52 | E34 | E16 | D45 | D27 | D14 | D6 | D1 |
| | E51 | E33 | | D44 | | D13 | | |

D1~D23 : DATA BLOCK 1  
E1~E44 : RS BLOCK 1   } BLOCK 1

D24~D46 : DATA BLOCK 2  
D45~E88 : RS BLOCK 2   } BLOCK 2

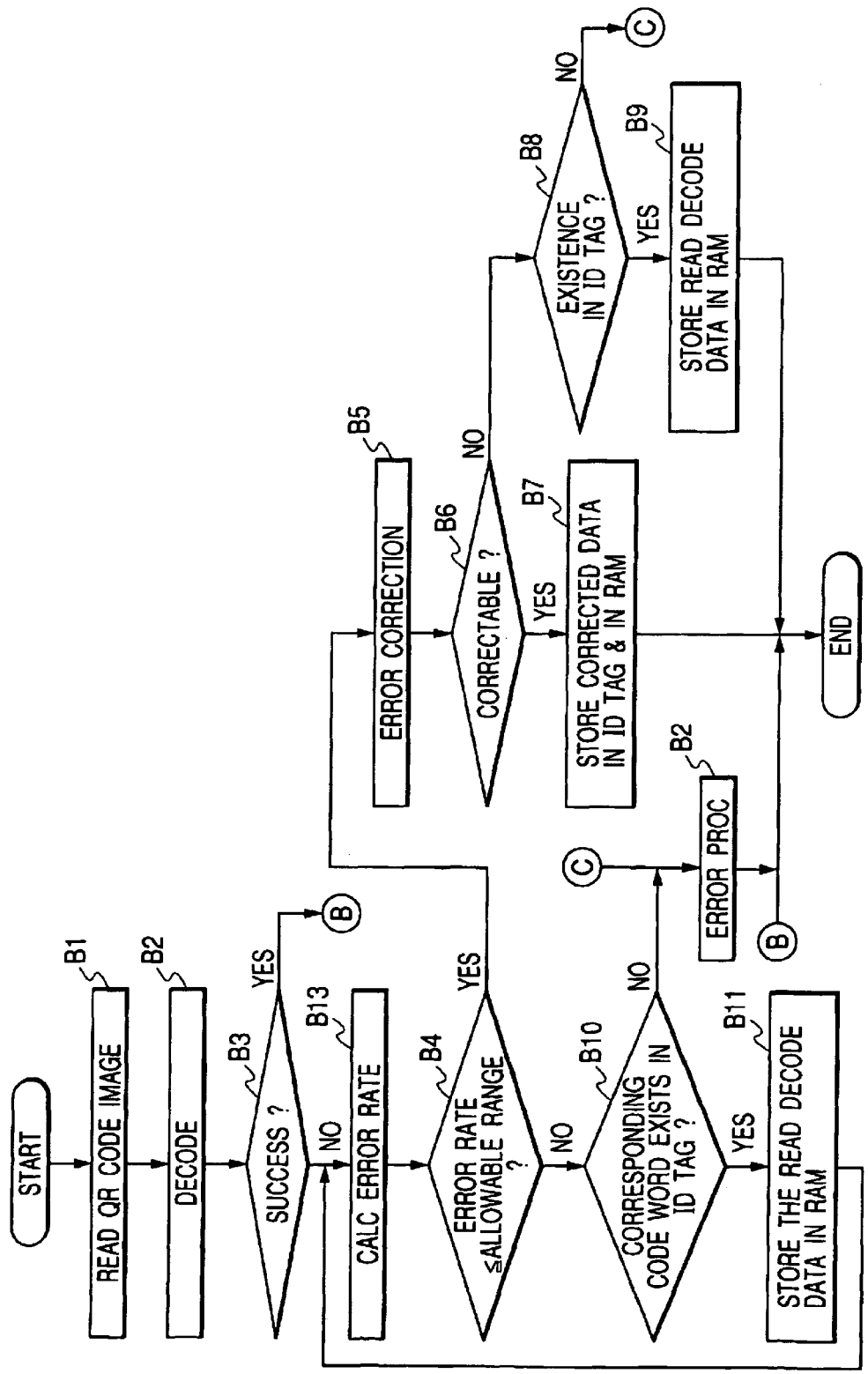

DATA CODE LABEL, A METHOD OF DECODING DATA CODES, AND AN OPTICAL DATA CODE DECODING SYSTEM

BACKGROUND OF THE INVENTION

1. Field of the Invention

This invention relates to a data code label, a method of decoding data codes, and an optical data code decoding system.

2. Description of the Prior Art

A data code label is adhered or attached to an article to control the physical distribution and the stock. The data code label has one-dimensional code such as a bar code or a two-dimensional code such as a QR code. During operation, the data code label may be scratched or stained, so that an error will occur in decoding. Thus, the data code label further stores error correction data. When an error is detected in decoding result, the data is error-corrected with the error collection data. However, the degree of scratching or staining may further increase with passage of time. Thus, finally, the data code label must be replaced with a new one. Therefore, it is required to provide an optical data code decoding system having resistance to damaged data codes.

SUMMARY OF THE INVENTION

The aim of the present invention is to provide a superior data code label, a superior method of decoding data code, and a superior optical data code decoding system.

According to the present invention, a first aspect of the present invention provides a data code label comprising:
   a base;
   an optical data image representing data codes and corresponding error correction codes on said base; and
   an ID tag on said base including: data input and output means: and a memory having an identification data writing area for storing identification data and a decode data writing area for storing decode data corresponding to at least a portion of said data codes received from said data input and output means.

According to the present invention, a second aspect of the present invention provides a method of decoding data codes comprising the steps of:
   (a) reading an optical data image representing said data codes and corresponding error correction codes on a base which supports an ID tag having input and output means and a memory;
   (b) decoding each of said data codes with said read optical data image to obtain decode data;
   (c) detecting an error in the result in step (b) with said error correction codes;
   (d) error-correction-decoding said data codes with said error correction codes to obtain said decode data when said error is detected in step (c); and
   (e) storing the result of step (d) in said memory through said input and output means as said decode data.

According to the present invention, a third aspect of the present invention provides a method based on the second aspect, further comprising the step of:
   (f) reading said decode data corresponding to one of data codes showing said error in step (c) from said memory through said input and output means when said error is detected in step (c), wherein said steps (d) and (e) are effected when said decode data cannot be read in step (f).

According to the present invention, a fourth aspect of the present invention provides a method based on the second aspect, wherein said steps (b) and (c) are repeatedly effected, said method further comprising the steps of:
   (g) calculating a rate of said errors in repeatedly effected steps (b) and (c) for all of said data codes and said error correction codes represented by said optical data image when said error is detected;
   (h) obtaining said decode data in said memory when said rate in step (g) is higher than a reference and said error is detected in step (c);
   (i) calculating said rate again such that said error of said decode data obtained in step (h) and said error correction code corresponding to said decode data obtained in step (h) is neglected when said error is detected in step (c) and said decode data is successfully obtained from said memory in step (h); and
   (j) effecting step (d) for another one of said data codes showing said error in step (c) when said rate in step (i) is not higher than said reference.

According to the present invention, a fifth aspect of the present invention provides a method based on the third aspect, further comprising the steps of:
   (g) storing said decode data obtained in steps (b), (d), (f); and
   (h) outputting said decode data stored in step (g).

According to the present invention, a sixth aspect of the present invention provides a method based on the second aspect, wherein said memory has an identification data writing area and a decode data writing area and in step (e), and said decode data is stored in said decode data writing area.

According to the present invention, a seventh aspect of the present invention provides an optical data image decoding system comprising:
   a data code label comprising: a base; an optical data image representing data codes and corresponding error correction codes on said base; and an ID tag on said base including: data input and output means: and a memory having an identification data writing area for storing identification data and a decode data writing area for storing decode data corresponding to at least a portion of said data codes received from said data input and output means;
   optical data image reading means for reading said optical data image;
   decoding means for decoding said data codes from said optical data image from said optical data image reading means to obtain said decode data:
   detecting means for detecting an error in said decoding means:
   error-correction decoding means for error-correction-decoding said data codes with said error correction codes to obtain said decode data when said error is detected; and
   storing means for storing said decode data obtained by said error-correction decoding means in said memory through said input and output means.

According to the present invention, an eighth aspect of the present invention provides the system based on the seventh aspect, further comprising:
   reading means for reading said decode data corresponding to one of data codes showing said error from said memory through said input and output means when said error is detected, wherein said error-correction decoding means and storing means are operated when said decode data cannot be read by said reading means.

According to the present invention, a ninth aspect of the present invention provides the system based on the seventh aspect, wherein said decoding means and said detecting means are repeatedly operated, said system further comprising:

first calculating means for calculating a rate of said errors of all of said data codes and said error correction codes represented by said optical image;

obtaining means for obtaining said decode data in said memory when said rate from said first calculating means is higher than a reference and said error is detected by said detection means;

second calculating means for calculating said rate again such that said error of said decode data obtained by said obtaining means and said error correction code corresponding to said decode data obtained by said obtaining means is neglected when and said error is detected by said detection means and said decode data is successfully obtained from said memory by said obtaining means, wherein said error-correction decoding means error-correction-decodes another one of said data codes showing said error detected by the detecting means when said rate calculated by said second calculating means is not higher than said reference.

According to the present invention, a tenth aspect of the present invention provides the system based on the seventh aspect, further comprising:

an optical data image reader having a case containing said reading means, said optical data image reading means, said decoding means, said detecting means, said correcting means, and said storing means.

BRIEF DESCRIPTION OF THE DRAWINGS

The object and features of the present invention will become more readily apparent from the following detailed description taken in conjunction with the accompanying drawings in which:

FIGS. 6 and 7 are illustrations of the QR code according to the prior art; and

FIG. 8 depicts a flow chart of operation in the two-dimensional code reader according to the second embodiment.

The same or corresponding elements or parts are designated with like references throughout the drawings.

DETAILED DESCRIPTION OF THE INVENTION

This invention prevents final impossibility in reading the data code label in which scratch or stain advances with passage of time by effecting error correction to the data code showing an error and by storing the error corrected data in the ID tag attached to the data code label.

First Embodiment

This embodiment will be described with a QR code as the data code with reference to FIGS. 1 to 7.

Figure 2:
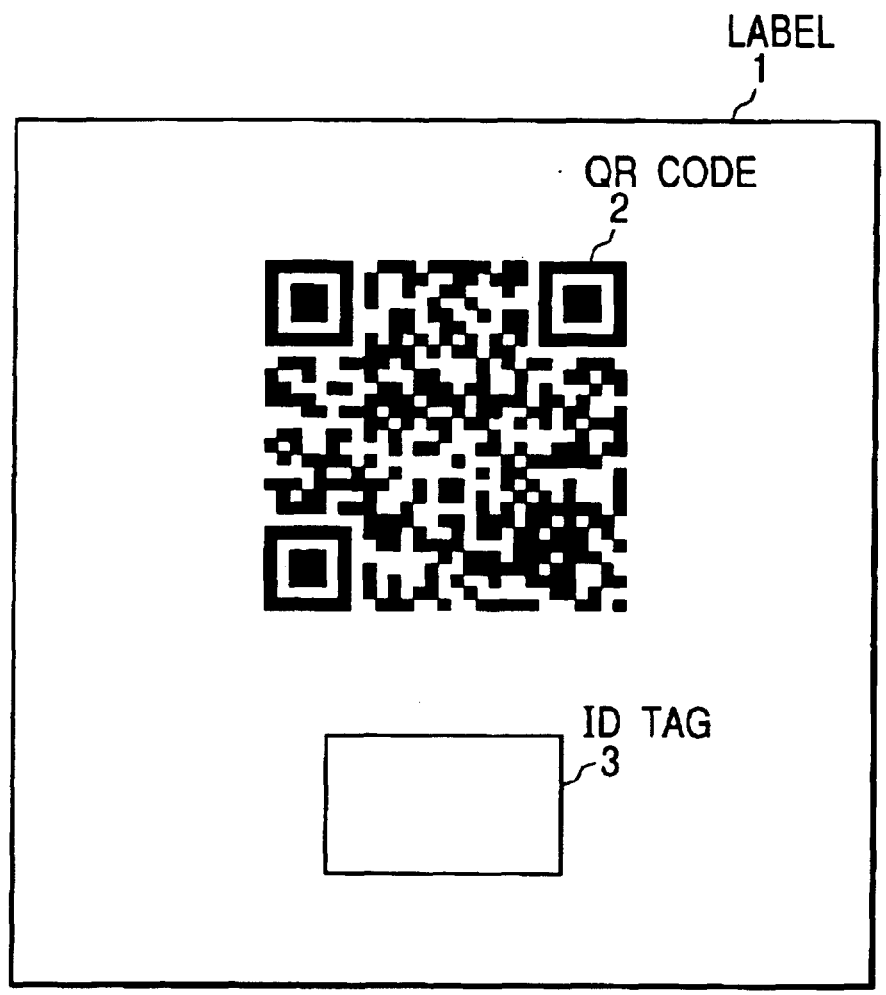
FIG. 2 is a plan view of a label according to this invention.
Figure 5:
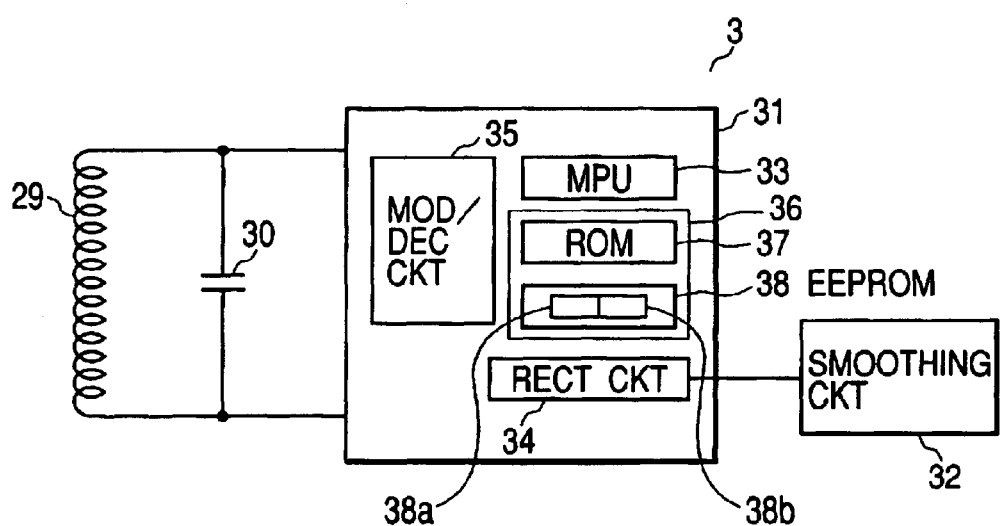
FIG. 5 is a block diagram of the ID tag according to this invention.

FIG. 2 is a plan view of a label 1. The label (base) 1 is adhered or attached to a surface of an article or a box containing an article to control the stock or the physical distribution. On the surface of the label 1, a QR code 2 as one of two-dimensional codes is printed. Moreover, an ID tag 3 is fixed to the surface of the label 1. As shown in FIG. 5, the ID tag 3 has an inputting and outputting portion and an EEPROM 38 having an identification data storing area 38a and a decoded data storing area 38b.

Here, in this embodiment, the label 1 supports the QR code 2 and the ID tag 3. However, the QR code 2 and the ID tag 3 may be directly printed and attached on a base of an article or a box containing the article.

Figure 3:
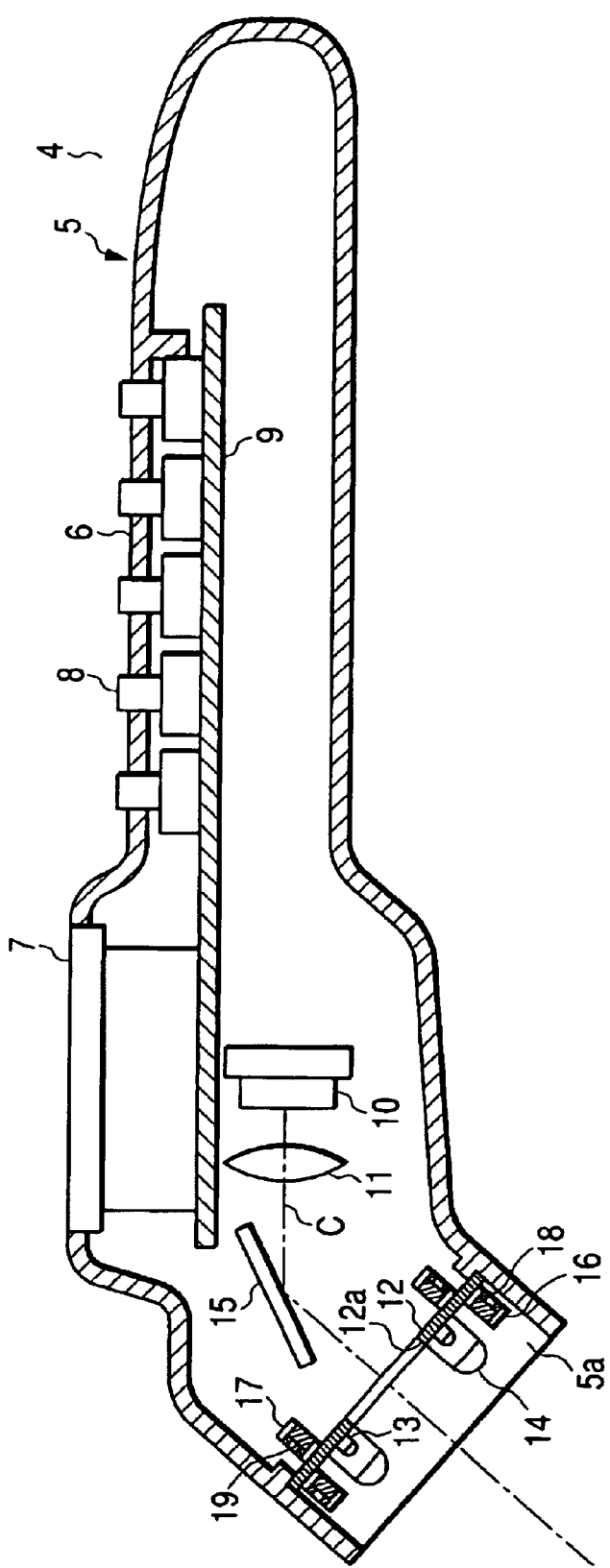
FIG. 3 is a sectional side elevation view of a two-dimensional code reader for reading the QR code and decoding the QR code according to this invention.

FIG. 3 is a sectional side elevation view of a two-dimensional code reader 4 for reading the image of the QR code 2 and decoding data codes in the QR code 2. The two-dimensional code reader 4 has a function for communicating with the IF tag 3 through a radio wave power transmission signal and for writing and reading data in the memory included in the ID tag 3.

The QR code 2 and the ID tag 3 stores various control data such as stock or selling control data in addition to the identification data. The QR code 2 can store a larger amount of data than the one-dimensional code. However, to do various controls the capacity is insufficient, so that various data is written in the ID tag 3.

The two-dimensional code reader 4 includes a portable case 5. The portable case 5 has a grip portion and an operation portion 6 on the grip potion, and an LCD (liquid crystal display) 7. The operation portion 6 includes a plurality of key switches 8. The user commands operations with the key switches 8.

The portable case 5 contains and supports a printed circuit board 9 therein. The printed circuit board 9 supports the LCD 7 and the key switches 8 on one surface thereof. On the other surface of the printed circuit board 9, a CCD area sensor 10 is arranged. In front of the CCD area sensor 10, an objective lens 11 is arranged on the printed circuit board 9.

The portable case 5 has a reading opening 5a at one end thereof. Near the reading opening 5a, a mirror 15 is provided on the optical axis C of the objective lends 11 and the CCD area sensor 10 to direct the light from the reading opening 5a to the objective lens 11 and the CCD area sensor 10. That is, the mirror 15 bends the optical axis C. Hence, the mirror 15 reflects the image of the QR code 2 on the label 1 to direct the beam of the image to the objective lens 11. The objective lens 11 arranged between the mirror 15 and the CCD area sensor 10 focuses the image of the QR code 2 on the CCD area sensor 10.

The reading opening 5a has a rectangular shape on a cross-sectional plane thereof.

Between the mirror 15 and the reading opening 5a, another printed circuit board 12 having a through hole for passing the reflected light therethrough is supported by the portable case 5. On one surface of the printed circuit board 12, LEDs (light emitting diodes) 13 are arranged beside the axis C (on both sides of the axis C). Each LED 13 is covered in a projection lens 14 to direct the illumination light to the label 1 with diffusion, when the portable case 5 is positioned such that the reading opening 5a substantially contacts with the label 1.

The printed circuit board 12 further supports bobbins 16 and 17 on both surfaces thereof. On the surfaces of the bobbins 16 at the front surface of the printed circuit board 12, transmission antenna coils 18 are wound. On the surfaces of the bobbins 17 at the back surface of the printed circuit board 12, receiving antenna coils 19 are wound. Here, the transmission antenna coils 18 and the receiving antenna coils 19 may be commonly used with a duplexer.

The printed circuit board 9 further includes a microprocessor (MPU) 20 for processing the image detection signal from the CCD area sensor 10 to detect the data codes and corresponding error correction codes represented by the QR code 2 and for executing processes in response to the key switches 8.

Figure 4:
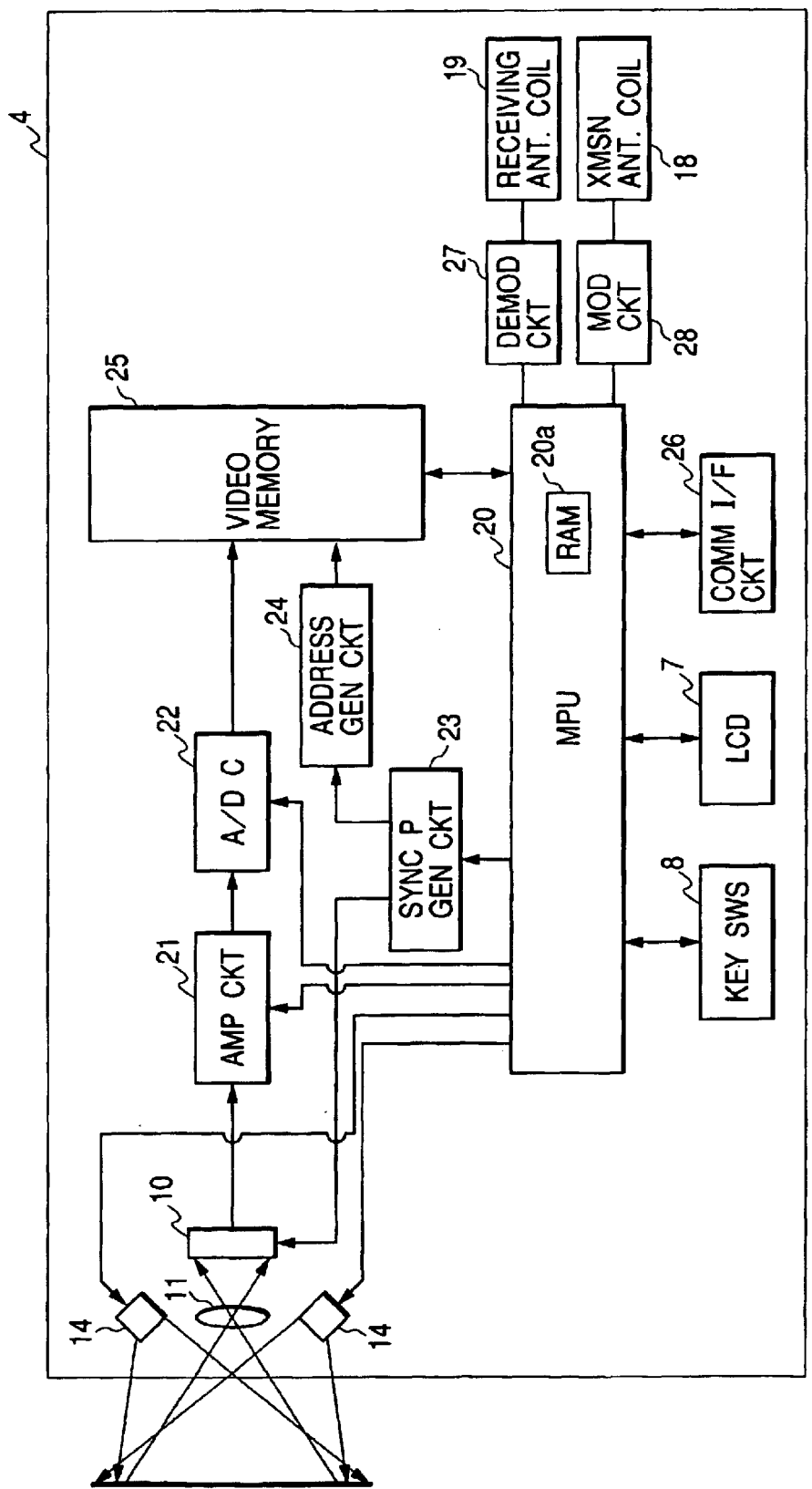
FIG. 4 is a block diagram of the two-dimensional code reader according to this invention.

FIG. 4 is a block diagram of the two-dimensional code reader 4 according to this embodiment.

The two-dimensional code reader 4 includes the LCD 7, the key switches 8, the CCD area sensor 10, the LEDs 13, the transmission antenna coils 18, the receiving antenna coils 19, the microprocessor 20, an amplifying circuit 21, an A/D converter 22, a synchronizing pulse generation circuit 23, an address generation circuit 24, a video memory 25, an communication I/F circuit 26, a demodulation circuit 27, a modulation circuit 28.

The microprocessor 20 includes a CPU, a ROM, a RAM 20a, an I/O and executes operations in accordance with the programs stored in the ROM. The microprocessor 20 controls the LCD 7, the communication I/F circuit 26 in accordance with the operation of the key switches 8.

The CCD area sensor 10 includes photoreceiving elements two-dimensionally arranged to receive the image focused by the objective lens 11 by successive horizontal scanning operations to output the image detection signal to the amplifying circuit 21. The amplifying circuit 21 amplifies the image detection signal from the CCD area sensor 10 with automatic gain control signal from the microprocessor 20 to supply the amplified image signal to the A/D converter 22. The A/D converter 22 converts the image detection signal into a multivalued digital image data. The multivalued digital image data is stored in the video memory 25. Thus, the multivalued digital image data represents a tone of 256 steps with eight bits. The microprocessor 20 decodes the two-dimensional data codes from the multivalued digital image data of the QR code 2, and the decode data is stored in the RAM 20a of the microprocessor 20.

The synchronizing pulse generation circuit 23 generates synchronizing pulses at a rate higher than that of the pulses in the image detection signal from the CCD area sensor 10. The address generation circuit 24 generates an address signal for the video memory 25 by counting the synchronizing pulses. The multivalued digital image data is written in the video memory 25 in response to every address at an eight-bit unit. The LCD 7 can display images with a tone of two steps for example to display the image of the QR code 2 with the multivalued digital image data from the video memory 25.

The communication I/F circuit 26 is provided for communication with an external terminal such as a host computer. For example, communication is effected with a light emitting element for transmitting and with a photoreceiving element for reception.

The transmission antenna coils 18, the receiving antenna coils 19, the modulation circuit 27, the demodulation circuit 28 are provided to communicate with the ID tag 3. The modulation circuit 27 modulates a reference signal to generate the radio wave power transmission signal including a power which is transmitted through the transmission antenna coil 18, and then, the modulation circuit 27 modulates the radio wave power transmission signal with the data to be transmitted. The modulated signal is transmitted through the transmission antenna coil 18 to the ID tag 3. That is, the data is superimposed on the radio wave power transmission signal. The demodulation circuit 27 demodulates the reception signal from the receiving antenna coil 19 to obtain the data from the ID tag 3.

FIG. 5 is a block diagram of the ID tag 3. The ID tag 3 comprises an antenna coil 29 for receiving and transmitting radio wave signals, a resonance capacitor 30, a control IC 31, and a smoothing circuit 32.

The control IC 31 includes a microprocessor unit (MPU) 33, a rectifying circuit 34, a modulation/demodulation circuit 35, and a memory 36, which are formed on a semiconductor chip. The memory 36 comprises a non-volatile memory, i.e., an EEPROM 38 and a ROM 37. The EEPROM 38 stores data regarding the article to which the label 1 is adhered.

The antenna coil 29 is connected to the resonance capacitor 30 in parallel to form a resonance circuit for receiving a radio wave power transmission signal to supply the received power signal to the rectifying circuit 34. The rectifying circuit 34 and the smoothing circuit 32 form a power supply. That is, the rectifying circuit 34 rectifies the received power transmission signal. The smoothing circuit 32 smooths the rectified power signal to provide a dc power supply which is supplied to a control portion in the control IC 31.

The transmitted radio wave power signal carries the modulated data by superimposing it on the radio wave power transmission signal. That is, the resonance circuit supplies the received radio wave power transmission signal to the modulation/demodulation circuit 35 also. The modulation/demodulation circuit 35 demodulates the modulated data and the demodulated data is supplied to the microprocessor 33. The microprocessor 33 operates in accordance with programs and data stored in the ROM 37 in the memory circuit 36 and with the received data signal. For example, the microprocessor 33 stores the received data in the radio wave power transmission signal in the EEPROM 38 in the memory circuit 36 and modulates the data from the memory circuit 36 to transmit the data through the antenna coil 29 to the two-dimensional code reader 4.

The recording area of the EEPROM 38 is divided into the identification data storing area 38a and the decoded data storing area 38b for storing the decoded data. The identification data storing area stores the identification data for identifying the article to which the label 1 is adhered and data which cannot be written in the QR code 2. The decoded data storing area 38b stores the decoded data with error correction of data from the QR code 2 when the decoded data shows an error due to a stain and a scratch or damage on the QR code 2 after error correction with the error correction codes.

QR Code, Error Detection and Error Correction

The QR code 2 two-dimensionally represents data codes as shown in FIG. 2.

Figure 7:
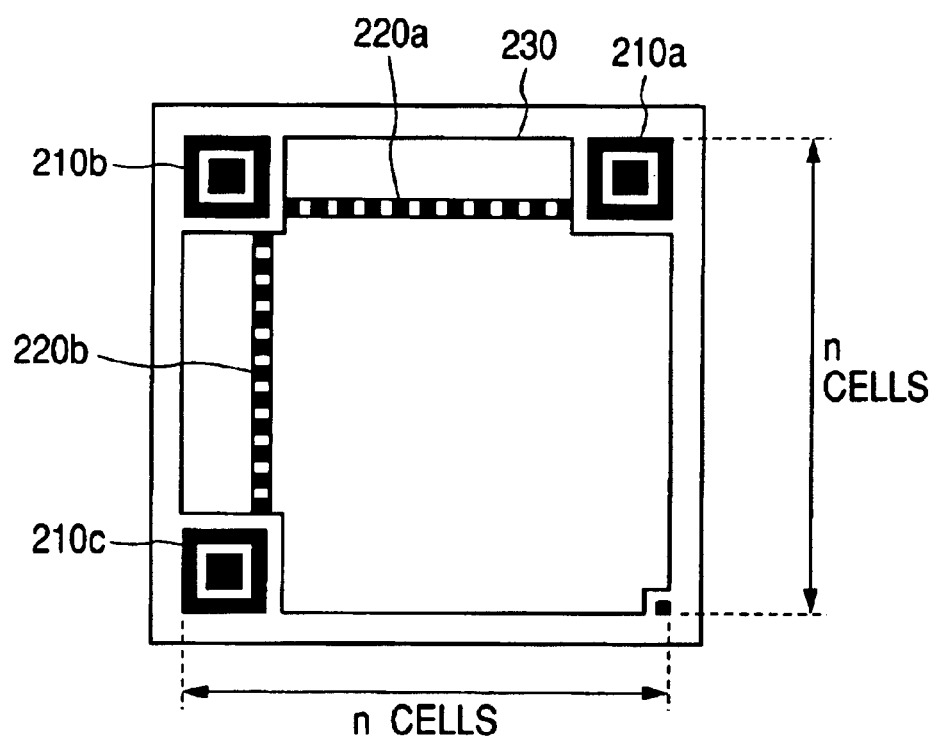

FIG. 7 is an illustration illustrating the structure of the QR code 2. In FIG. 7, the QR code 2 has positioning symbols 210a to 210c for determining the position of the QR code 2 and timing cells 220a and 220b having a reference pattern arranged between successive two of the positioning symbols 210a to 210c for determining positions of data cells. The reference pattern has black and white squares alternately.

The QR code has an array including $n \times n$ cells therein. The positioning symbols 210a to 210c have the figure provided such that a black square 212 of which one side corresponds to seven cells, a white square of which one side corresponds to five cells, and a black square of which one side corresponds to three cells, are coaxially overlapped with each other.

If each of positioning symbols 210a to 210c is scanned around its center horizontally or vertically, the detected image signal represents a pattern of black (shadow), white (highlight), black, white portions at 1:1:3:1:1. Thus, if this pattern is detected, this pattern is presumed to be a candidate of the positioning symbols 210a to 210c and examined with priority to determine the position of the QR code. Next, the shape of the QR code 2 is recognized in the parallelism uniquely determined by three positioning symbols 210a to 210c.

The data in the QR code 2 is represented at data cells at a data recording region 230 except the positioning symbols 210a to 210c and timing cells 220a and 220b. Patterning a data cell with black (shadow) or white (highlight) represents one bit. In FIG. 7, the data cells are omitted.

The position of each data cell is determined from the positions of three positioning symbols 210a to 210c. Next, the level around the center of the data cell is detected. If the detected level represents black, the data is judged to be "1" and if white, the data is judged to be "0" for example. This provides recognition or decoding of a binary data.

If there is an error in decoding because the detection image signal representing a QR code 2 includes a defective portion, the two-dimensional code reader 4 corrects the error with error correction data. The data cell may be defected by a stain or a scratch.

Generally, two-dimensional codes include error correction codes having a high capability of error correction. FIG. 6 shows data cells in the QR code 2. As shown in FIG. 6, the data recording area in the QR code 2 is divided into a data block and an error correction block which are provided for Reed Solomon coding (referred to as "RS"). The error correction blocks are for storing redundant data for the RS coding. In the data block and the error correction block, each of eight bits forms a code word as a unit. In FIG. 6, each of references D1 to D46 and E1 to E88 corresponds to one code word. Hereinafter, the error correction block is referred to as "RS block" and the code word in this block is referred to as RS code word (error correction data), and the code words in the data block is referred to as data code words.

The QR code 2 shown in FIG. 6 includes block 1 including data code words D1 to D23 and RS data code words E1 to E44 and block 2 including data code words D24 to D46 and RS data codes E45 to E88. The RS coding is effected at the unit of each of blocks 1 and 2. That is, error correction is effected at every block 1 and block 2.

In this embodiment, the error correction is effected with the RS code. However, other error correction methods can be used.

The error correction in the QR code is disclosed in U.S. patent application Ser. No. 09/667,799, filed Sep. 22, 2000, entitled "TWO-DIMENSIONAL-CODE RELATED METHOD, APPARATUS, AND RECORDING MEDIUM", the disclosure of which is hereby incorporated by reference.

The error correction in the QR code 2 is effected by the detection-based type of error correction for example. In this method, a syndrome polynomial is obtained from data in each block. Next, an error position polynomial and an error value polynomial are obtained from the syndrome polynomial. Next, the code word including the error is detected from the error position polynomial. Next, a magnitude of the error (error pattern) is obtained at the obtained error position with the error value polynomial.

Generally, the error correction is effected with the RS code. However, the error correction may be effected by adding a parity and the error position is detected with the parity. Then, the anti-erasure type (a disappearance-based type) of error correction is effected with the detected position to improve the efficiency in error correction. Moreover, in the QR code, black and white cells are distributed randomly. With this assumption, if a code word block includes only block or white cells, this code word block can be judged to have an error.

Reading Operation

Figure 1:
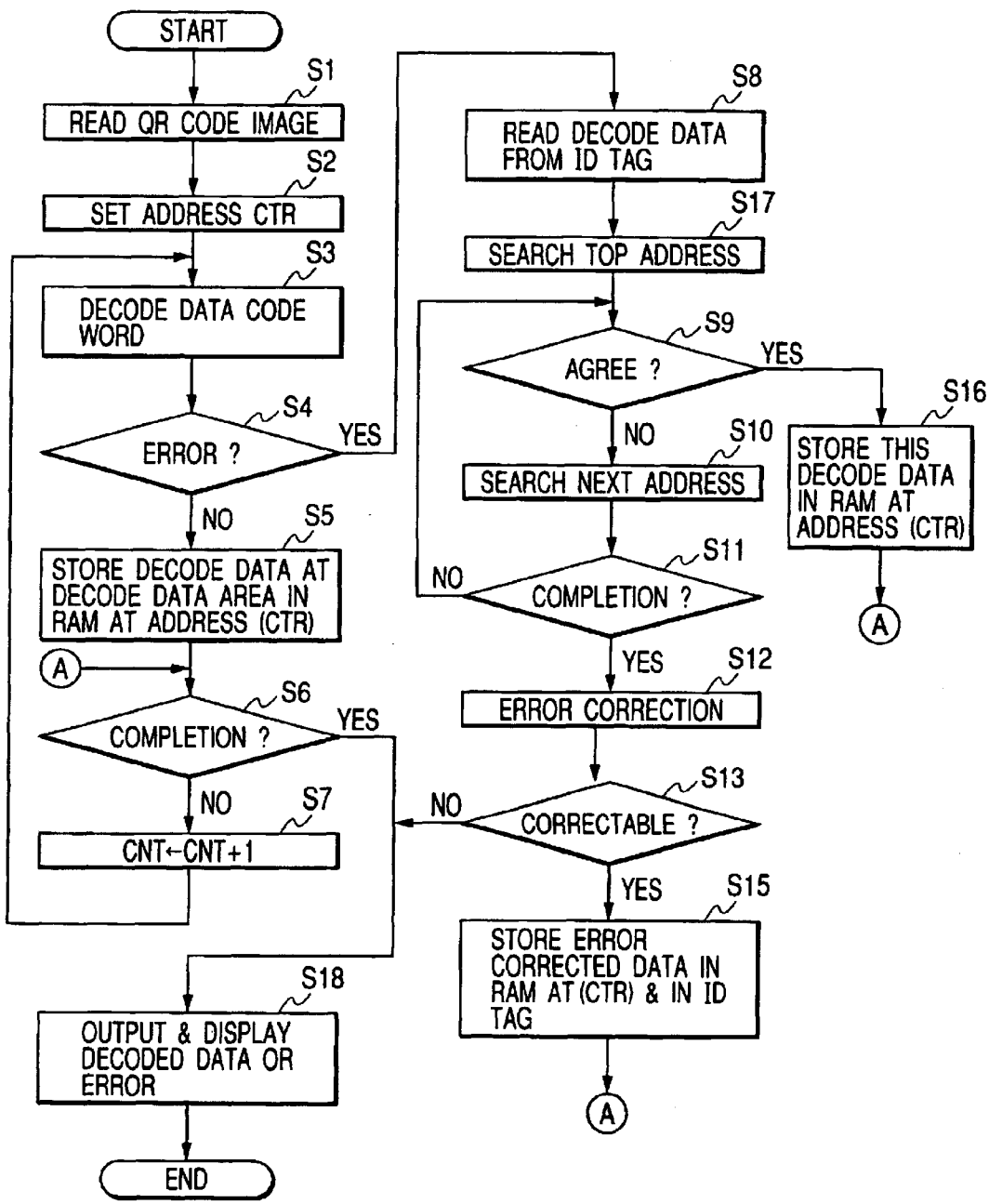
FIG. 1 depicts a flow chart of operation in the two-dimensional code reader according to the first embodiment.

FIG. 1 depicts a flow chart of the reading operation according to this embodiment.

A user puts the opening 5a of the two-dimensional code reader 4 on the QR code 2 on the label 1 and operates a predetermined key switch 8. Then, the LEDs 13 turn on to illuminate the QR code 2. The reflected light is focused on the CCD area sensor 10 by the object lens 11. The image focused on the CCD area sensor 10 is read and stored as multivalued digital image data in the video memory 25 in step S1. The microprocessor 20 sets a top address of a predetermined storing area in the RAM 20a to an address counter CTR to store every decoded data code word of the QR code in the RAM 20a thereof in step S2.

The microprocessor 20 decodes the data code words of the QR code 2 in the predetermined order, i.e., in this embodiment, in order from data code word D1, from the image data stored in the video memory 2D in step S3. In the following step S4, the microprocessor 20 judges whether the data code word has a defective portion, that is, judges whether an error occurs in the decoded data with error correction data (error detection data) in step S3. If no error, the decoded data code word is stored in the predetermined storing area at the address (CRT) indicated by the address counter CTR in step S5. Next, the microprocessor 20 judges whether the decoded data code word is the last one in step S6. If the decoded data code is not the last one, the microprocessor 20 increments the counter CTR in step S7, and processing returns to step S3. The microprocessor 20 repeats this processing until the decoded data code is judged to be the last one in step S6. If the decoded data code word is judged to be the last one in step S6, processing ends via step S18. That is, the decoding of the QR code has finished.

Here, if a QR code 2 may be stained. In this case, though the stain is small at first, it may spread out. Similarly, if a QR code 2 is damaged or scratched. In this case, though the breakage or scratch is small at first, it may spread out. Such a defect causes an error in decoding. However, if the degree of the defect is low, the data code word can be decoded with the error correction code, that is, the RS code word.

Then, the error correction operation will be described with assumption that the QR code 2 has a defect such as a stain, a breakage, or a scratch, and the defect spreads out.

In this condition, in step S4, the microprocessor 20 judges that there is an error in decoding. Then, the microprocessor 20 transmits the radio wave power transmission signal from the transmission antenna coil 18 to communicate with the ID tag 3 and reads decode data and the corresponding address data at decode data storing area 38b in the EEPROM 38 of the ID tag 3 in step S8.

Next, the microprocessor 20 searches data from the top address in the decoded data storing area 38b in step S17. Then, the microprocessor 20 compares the address counter value (CTR) with the searched address. If the address counter value (CTR) disagrees with the searched address value, the microprocessor 20 searches the next address in the decode data storing area 38a in step S10. Next, the microprocessor 20 checks whether the address searching has completed in step S11. If NO, processing returns to step S9. In step S11, the address searching has completed, the microprocessor 20 effects error correction to the data code word to obtain the decoded data with the RS codes in step S12. The microprocessor 20 checks whether the data code word is correctable in step S13. If the data code word is not correctable, the microprocessor 20 displays or outputs the partially decoded data and the error in step S16 and ends the processing.

If the data code word is correctable in step S13, the microprocessor 20 stores the corrected decode data in the RAM 20a at address (CTR) and detects the top address of the spare space in the decoded data storing area 38a in the ID tag 3. Then, the microprocessor 20 stores the corrected decode data and correspondingly stores the address value (CTR) at the top address of the spare space in the decoded data storing area 38a (this will be searched in step S10 or S17). Next, processing retunes to step S6 to decode the remaining data code words.

The decoded data of a data code word and the corresponding address data may have been stored in the ID tag 3 because the QR code is defected and the defection advances, and thus, the corrected decode data may have been stored in the ID tag. In this case, the answer in step S9 becomes YES, and then, the microprocessor 20 stores the decoded data in the RAM 20a at the address (CTR) with reference the corresponding address data in step S16. Next, processing retunes to step S6 to decode the remaining data code words.

As mentioned above, while the degree of defection of the QR code 2 is low, the data code word is corrected with RS code words, and the corrected decode data is stored in the ID tag 3 while the correction is possible. With advance of the defection of the QR code 2, if data code words successively show errors in decoding, the data code words are stored in the order of occurrences of errors, so that there is no possibility that the QR code 2 cannot be decoded though the degree of defection of the QR code 2 increases.

Second Embodiment

FIG. 8 shows a second embodiment according to this invention. In this embodiment, if there is an error in decoding, the error rate is detected. Then, if the error rate is within an allowable range, the decoded data is obtained by the error correction with RS code words instead reading the decode data from the ID tag 3. This is because if the error rate is equal to or lower than 30%, that is, if the area of data code words and the RS code words showing errors in decoding is equal to or lower than 30% of the code area of the QR code, the error correction with RS code words is possible.

In step B1, the microprocessor 20 reads the QR code image. Next, the microprocessor 20 decodes the data code word in the QR code 1 in step B2. The microprocessor 20 checks whether the decoding has successfully completed (without an error) in step B3. If the decoding has successfully completed, processing ends via point B.

If the decoding has not successfully completed in step B3, that is, if at least an error occurs in decoding in step B3, the microprocessor 20 calculates the error rate in step B13 and compares the error rate of the data code words and the RS code words with the allowable range in step B4. If the error rate is within the allowable range, that is, the error rate is equal to or lower than 30% of the code area of the QR code 2, the microprocessor 20 does error correction in step B5. Next, the microprocessor 20 judges whether the error is correctable in step B6. If the error is correctable in step B6, the microprocessor 20 stores the corrected data in the ID tag 3 and in the RAM 20a thereof in step B7, and processing ends. In storing the corrected data, the address counter value (CTR) is stored with the corrected data in the ID tag 3 in the same way as the first embodiment.

If the error correction is impossible in step B6, in step B8, the microprocessor 20 searches the decode data which has been stored at the decoded data storing area of the ID tag 3 in step B7. More specifically, the microprocessor 20 checks whether there is a data code word of which address in the decoded data area 38b in the ID tag 3 agrees with the address (CTR) for the RAM 20a storing the decode data in the same way as the first embodiment.

If the decoded data storing area 38b stores the decode data, the microprocessor 20 stores the read decode data in the RAM 20a at the address (CTR) in step B9. If the decoded data storing area 38b does not store the decode data in step B8, processing proceeds to step B12 to execute an error processing and ends.

In step B4, when the error rate exceeds the allowable range, the microprocessor 20 searches one of data code words to be decoded in the decode data storing area 38b through communication with the ID tag 3 in step B10.

If one of the data code words is stored in the decode data storing area 38b, the microprocessor 20 reads the decode data and stores the decode data in the RAM 20a in step B11. Next, the microprocessor 20 calculates the error rate again such that the error of the data code words and the RS code words corresponding to the obtained decode data is neglected or cancelled. That is, this decreases the error rate. If this makes the error rate within the allowable range, the microprocessor 20 makes the error correction in step B5. If this does not make the error rate within the allowable range in step B4. The microprocessor 20 searches another decode data in the decode data storing area 38b in step B10 again to reduce the error rate within the allowable range. If there is another decode data in the decode data storing area 38b, processing proceeds to steps B11 and B13 again. If there is no further decode data in the decode data storing area 38b, processing proceeds to step B12 and ends.

As mentioned above, according to this embodiment, if the error rate in decoding is within the allowable range (30%), the microprocessor 20 makes the error correction with the RS code words instead reading the decode data from the ID tag 3 and then, stores the corrected decode data in the ID tag 3 and in the RAM 20a thereof, so that the data code word having a defect can be stored while the degree of defect is low.

Although the defect in the QR code 2 advances, the microprocessor 20 makes the error correction as much as possible to reduce processing time interval because communication with ID tag 3 is slow due to serial communication. More specifically, if the defect in the QR code 2 advances, the microprocessor 20 obtains not all decode data from the ID tag 3 but tries to obtain data code word by error correction. That is, reading the decode data from ID tag 3 reduces the error rate and if the error rate decrease within the allowable range, the microprocessor 20 starts error correction with the RS codes to reduce communication time interval.

Modifications

Data codes other than the QR code 2 may be used in this system. Moreover, this invention is applicable to one-dimensional code such as the bar code.

Other error detection and error correction methods can be used. Various correction data other than the RS code can be used.

It may be judged whether the decode data corresponding to a data code word under decoding is stored in the ID tag 3 as follows:

The number of the data code word (for example D20) in the QR code 2 is stored in the EEPROM 38 with the decode data. When there is an error in decoding, the data code word may be searched by searching the number of the data code word in the EEPROM 38.

Moreover, the ID tag 3 may be adhered to the label 1 when an error in decoding is detected. That is, the ID tag 3 is not adhered to the label 1 until an error in decoding is detected.

What is claimed is:

1. A method of decoding data codes comprising:

(a) reading an optical data image representing said data codes and corresponding error correction codes on a base which supports an identification (ID) tag having input and output means and a memory;

(b) decoding each of said data codes with said read optical data image to obtain decode data;

(c) detecting an error in the result in step (b) with said error correction codes;

(d) error-correction-decoding said data codes with said error correction codes to obtain said decode data when said error is detected in step (c);

(e) storing the result of step (d) in said memory through said input and output means as said decode data; and (f) reading said decode data corresponding to one of data codes showing said error in step (c) from said memory through said input and output means when said error is detected in step (c), wherein said steps (d) and (e) are effected when said decode data cannot be read in step (f).

2. The method as claimed in claim 1, wherein said steps (b) and (c) are repeatedly effected, said method further comprising the steps of:

(g) calculating a rate of said errors in repeatedly effected steps (b) and (c) for all of said data codes and said error correction codes represented by said optical data image when said error is detected;

(h) obtaining said decode data in said memory when said rate in step (g) is higher than a reference and said error is detected in step (c);

(i) calculating said rate again such that said error of said decode data obtained in step (h) and said error correction code corresponding to said decode data obtained in step (h) is neglected when said error is detected in step (c) and said decode data is successfully obtained from said memory in step (h); and (j) effecting step (d) for another one of said data codes showing said error an step (c) when said rate in step (i) is not higher than said reference.

3. The method as claimed in claim 1, further comprising the steps of:

(g) storing said decode data obtained in steps (b), (d), (f); and (h) outputting said decode data stored in step (g).

4. The method as claimed in claim 1, wherein said memory has an identification data writing area and a decode data writing area and in step (e), and said decode data is stored in said decode data writing area.

5. An optical data image decoding system comprising:

a data code label comprising; a base; an optical data image representing data codes and corresponding error correction codes on said base; and an identification (ID) tag on said base including; data input and output means; and a memory having an identification data writing area for storing identification data and a code data writing area for storing decode data corresponding to at least a portion of said data codes received from said data input and output means;

optical data image reading means for reading said optical data image;

decoding means for decoding said data codes from said optical data image from said optical data image reading means to obtain said decode data;

detecting means for detecting an error said decoding means;

error-correction decoding means for error-correction-decoding said data codes with said error correction codes to obtain said decode data when said error is detected;

storing means for storing said decode data obtained by said error-correction decoding means in said memory through said input and output means; and reading means for reading said decode data corresponding to one of data codes showing said error from said memory through said input and output means when said error is detected, wherein said error-correction decoding means and storing means are operated when said decode data cannot be read by said reading means.

6. The system as claimed in claim 5, wherein said decoding means and said detecting means are repeatedly operated, said system 5 further comprising:

first calculating means for calculating a rate of said errors of all of said data codes and said error correction codes represented by said optical image;

obtaining means for obtaining said decode data in said memory when said rate from said first calculating means is higher than a reference and said error is detected by said detection means;

second calculating means for calculating said rate again such that said error of said decode data obtained by said obtaining means and said error correction code corresponding to said decode data obtained by said obtaining means is neglected when and said error is detected by said detection means and said decode data is successfully obtained from said memory by said obtaining means, wherein said error-correction decoding means error-correction-decodes another one of said data codes showing said error detected by the detecting means when said rate calculated by said second calculating means is not higher than said reference.

7. The system as claimed in claim 5, further comprising:

an optical data image reader having a case containing said reading means, said optical data image reading means, said decoding means, said detecting means, said correcting means, and said storing means.

* * * * *